US012789694B2

(12) United States Patent
Wood

(10) Patent No.: US 12,789,694 B2
(45) Date of Patent: Nov. 10, 2026

(54) INSTALLERS VAN

(71) Applicant: Nathaniel Wood, Streetsboro, OH (US)

(72) Inventor: Nathaniel Wood, Streetsboro, OH (US)

( * ) Notice: Subject to any disclaimer, the term of this patent is extended or adjusted under 35 U.S.C. 154(b) by 579 days.

(21) Appl. No.: 18/455,831

(22) Filed: Aug. 25, 2023

(65) Prior Publication Data

US 2025/0065818 A1 Feb. 27, 2025

(51) Int. Cl.
*B60P 3/14* (2006.01)
*B60P 3/00* (2006.01)
*B60R 11/06* (2006.01)

(52) U.S. Cl.
CPC .................... *B60P 3/14* (2013.01); *B60P 3/00* (2013.01); *B60R 11/06* (2013.01)

(58) Field of Classification Search
CPC .......................................................... B60P 3/14
USPC ............................................ 296/24.32, 24.44
See application file for complete search history.

(56) References Cited

U.S. PATENT DOCUMENTS 3,207,264 A * 9/1965 Melvin ...................... B60P 3/14 187/243
4,237,716 A * 12/1980 Onisko .................. B21D 5/042 72/319
D317,110 S * 5/1991 Arehart ............................ D8/66
5,452,972 A * 9/1995 Adams .................... B60P 7/135 292/121
5,498,048 A * 3/1996 Shelby, Jr. ................ B60P 3/14 296/24.45
5,791,713 A * 8/1998 Dubuc ...................... B60P 3/14 296/24.32
5,819,619 A * 10/1998 Miller .................. B23D 59/006 83/100
6,325,435 B1 * 12/2001 Dubuc ...................... B60P 3/14 296/24.32
7,588,278 B1 * 9/2009 Luneack ................... B60P 3/14 296/24.32
7,591,497 B2 * 9/2009 Johns ........................ B60P 3/14 296/24.32
8,523,256 B2 * 9/2013 McCoubrey .............. B60P 3/14 296/24.32
9,073,473 B2 * 7/2015 Cramer ...................... B60S 1/64
9,969,317 B2 * 5/2018 Eichstedt .................. B60P 7/08
10,414,342 B2 * 9/2019 Williams ............... B62D 33/04
11,208,048 B2 * 12/2021 Herriman .................. B60R 5/04
11,318,621 B2 * 5/2022 Mori ...................... B25J 9/0096
11,470,961 B2 * 10/2022 Henry, Jr .................. B60R 7/08
(Continued)

FOREIGN PATENT DOCUMENTS

CN 206797227 U * 12/2017

OTHER PUBLICATIONS

"Cargo Van", https://adventurevans.com/cargo_vans, posted to the internet Aug. 18, 2022, printed form the Wayback Machine.*
(Continued)

*Primary Examiner* — Jason S Morrow
(74) *Attorney, Agent, or Firm* — Daniel M. Cohn; Howard M. Cohn

(57) ABSTRACT

A van outfitted to carry all the tools necessary for installing windows and doors.
The van includes a side opening door and a rear door to provide access to an interior of the van. The interior of the van is designed to house all of the tools needed to install the windows and doors. On opposite interior walls of the van, there are a plurality of studs and interconnecting braces to mount various tools.

19 Claims, 5 Drawing Sheets

(56) References Cited

U.S. PATENT DOCUMENTS

| | | | | |
|---|---|---|---|---|
| 11,590,901 | B1 * | 2/2023 | Austin, III | B60R 11/00 |
| 12,496,956 | B2 * | 12/2025 | Gerez | B60P 7/0815 |
| 2007/0182182 | A1 * | 8/2007 | Hall | B60P 3/14<br>296/24.32 |
| 2010/0301624 | A1 * | 12/2010 | Boos | B60R 11/06<br>296/24.32 |
| 2016/0031054 | A1 * | 2/2016 | Chang | B23Q 11/0046<br>144/252.1 |
| 2017/0217396 | A1 * | 8/2017 | Paunov | B60R 21/026 |
| 2024/0425128 | A1 * | 12/2024 | Dorszynski | B60R 16/0207 |
| 2025/0128369 | A1 * | 4/2025 | Martino | B23Q 1/0009 |

OTHER PUBLICATIONS

“Packout Hangout & Organization Nation”, posted to Facebook Mar. 26, 2023.*

* cited by examiner

INSTALLERS VAN

TECHNICAL FIELD OF THE INVENTION

The present invention relates generally to and more particularly to a installers van to carry all the tools necessary for installing windows and doors.

BACKGROUND OF THE INVENTION

The installation of doors and windows often requires installation tools which must be transported to the jobsite. Typically, this is accomplished by carrying the tools to the jobsite in a trailer connected to a truck. Of course, the truck and trailer system are difficult to learn how to drive and be confident and experienced to handle the truck and trailer. There is a great deal of stress experienced by the operator as they learn how to drive a truck with an attached trailer.

Operating a truck and trailer system adds ample amounts of stress with the associated operational risk such as driving, backing up, and proper connections.

Further there is a significant amount of financial liability associated with the higher cost of the trailer. Moreover, the trailer cannot always be parked in direct proximity to the jobsite. Also, a trailer isn't always capable of carrying all the installation tools necessary to complete any fenestration installation.

SUMMARY OF THE INVENTION

A van outfitted to carry all the tools necessary for installing windows and doors. The van includes a side opening door and a rear door to provide access to an interior of the van. The interior of the van is designed to house all of the tools needed to install the windows and doors. On opposite interior walls of the van, there are a plurality of studs and interconnecting braces to mount various tools.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

Figure 1:
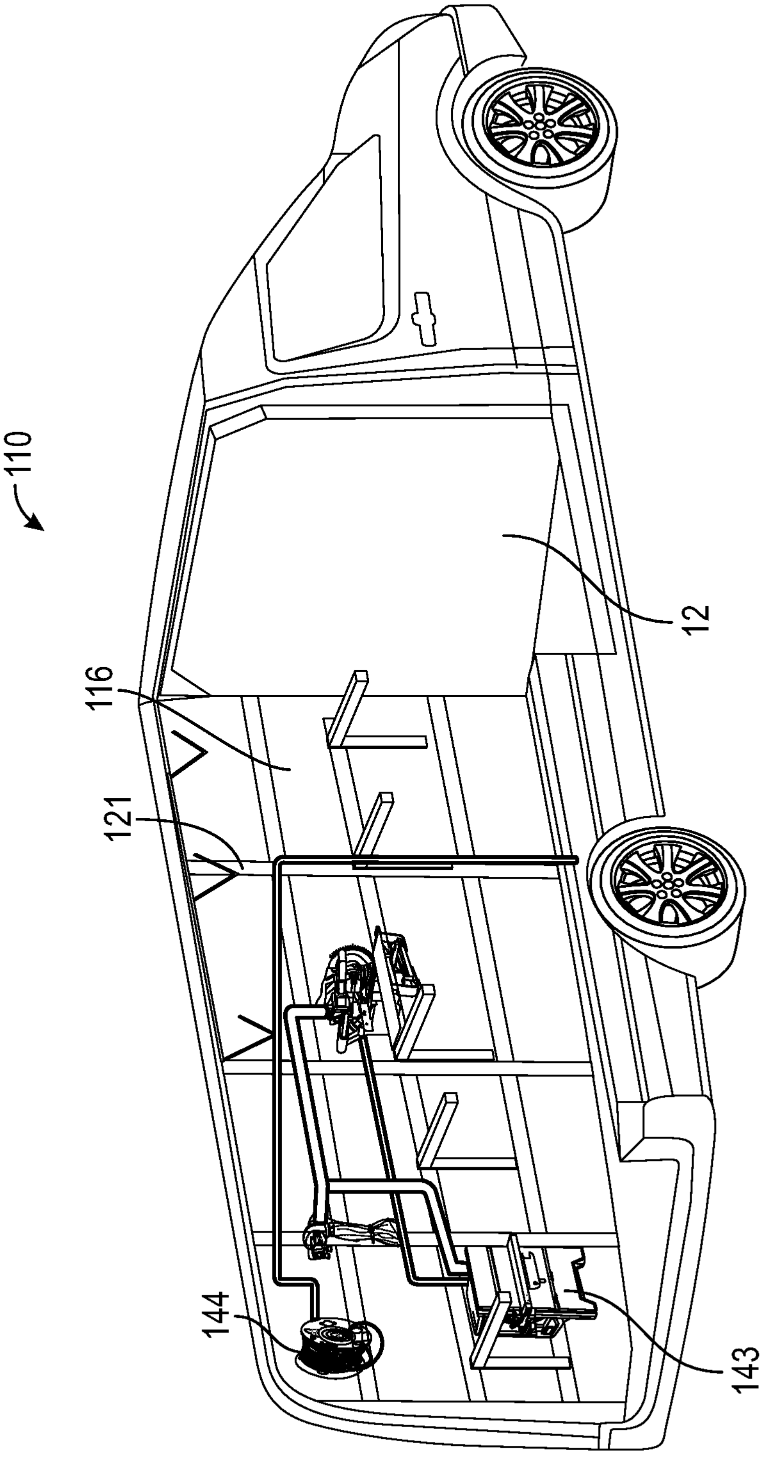
FIG. 1 is a partial view of van that is outfitted to carry all the tools necessary for installing windows and doors, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

Referring to FIG. 1 there is illustrated a van 10 outfitted to carry all the tools necessary for installing windows and doors. The van 10 includes a side opening door 112 and a rear door 114. The interior 116 of the van 10 is designed to house all of the tools needed to install windows and doors.

Figure 2:
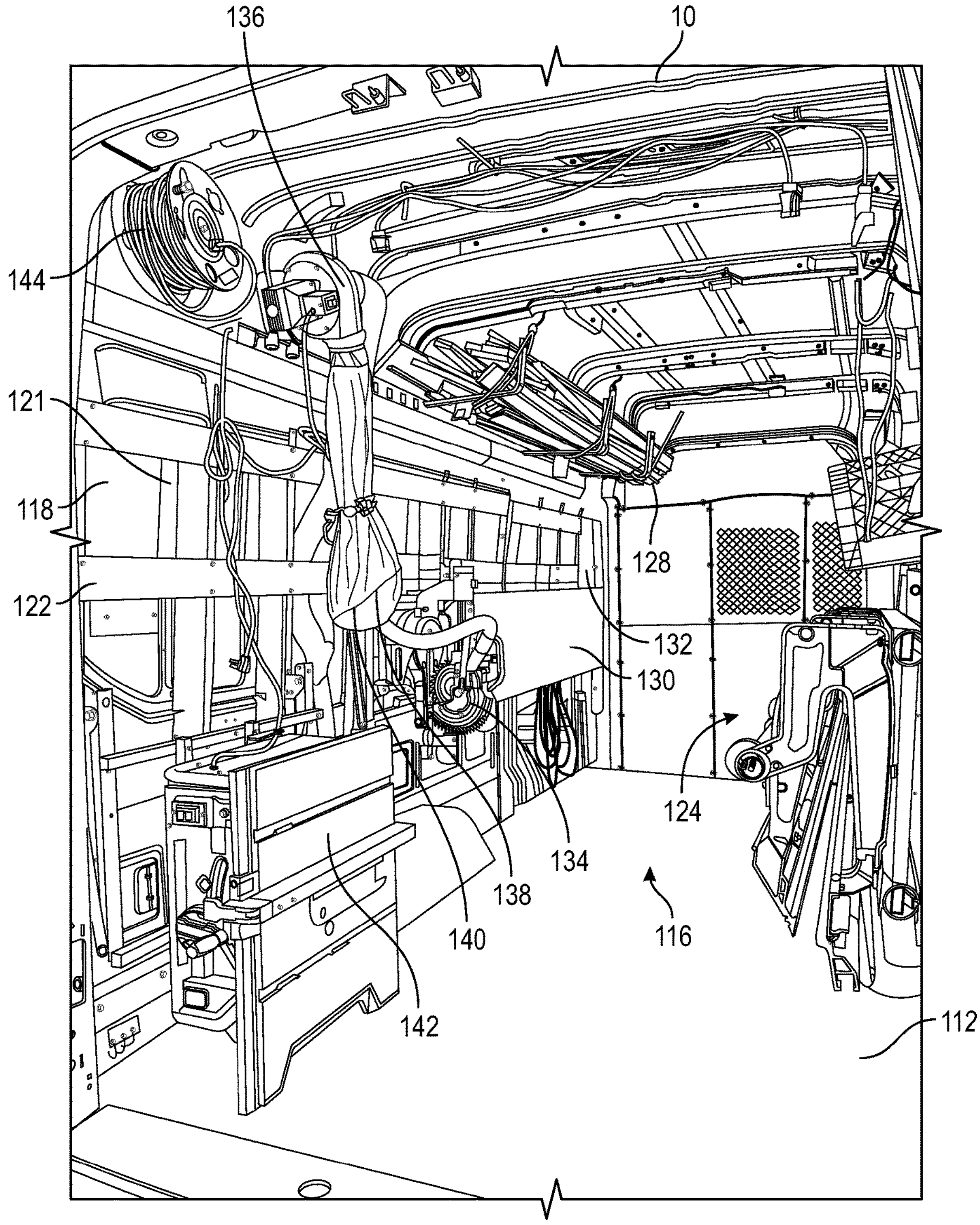
FIG. 2 shows the left side of the interior of a van that is outfitted to carry all the tools necessary for installing windows and doors, in accordance with the present invention.

Referring to FIG. 2, there is shown the interior 116 of the van 10 with the rear door 112 open to provide easy access. On both interior walls 118 and 120 of the van, there are a plurality of studs 121 and interconnecting braces 122 which are provided to mount various tools such as a metal brake 124 commonly used for creating cuts and bends in aluminum sheet metal. Brakes are used for various applications such as cutting, bending and finishing aluminum siding for homes. Other components such as battery chargers 126 can be mounted to the studs 120.

Figure 3:
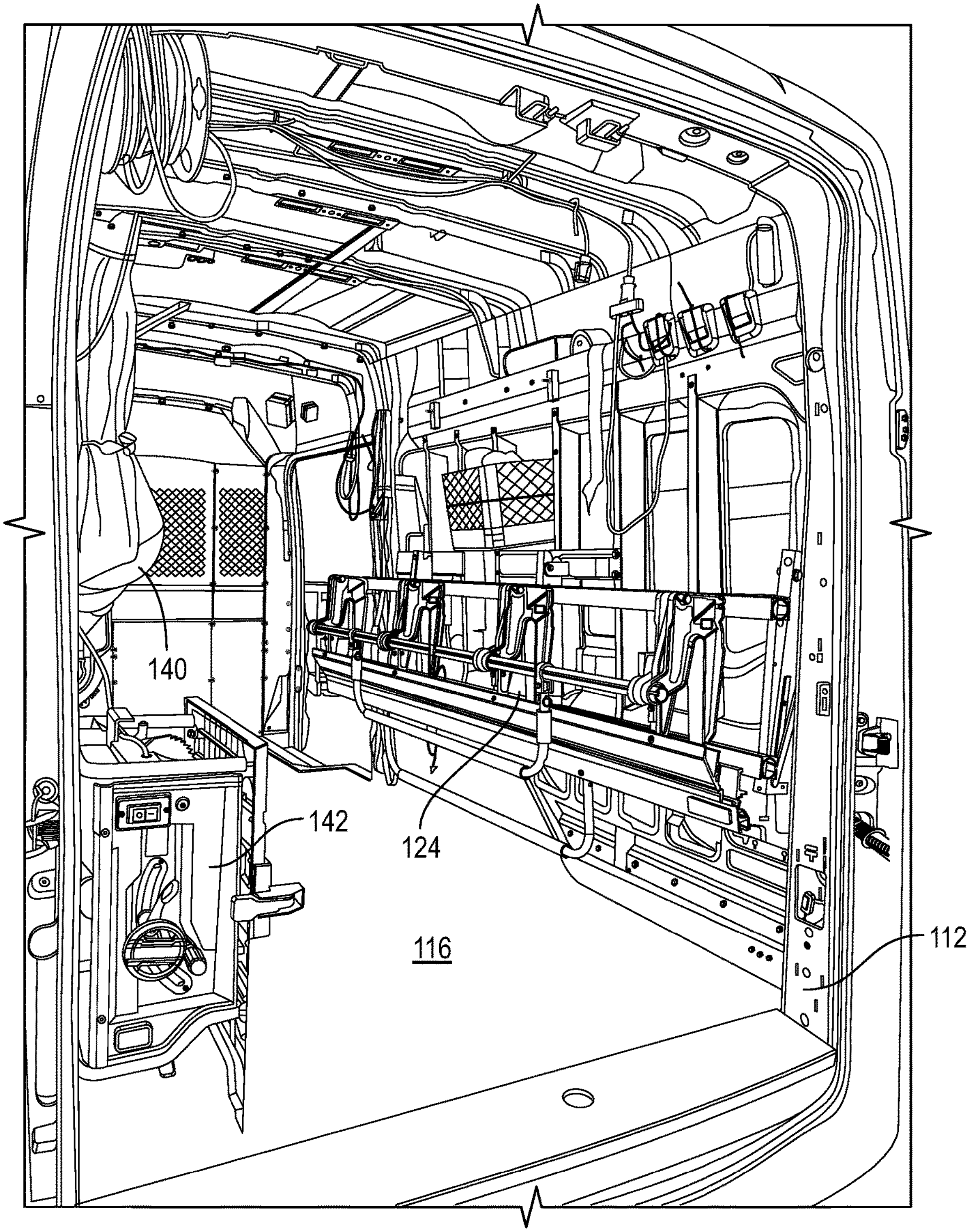
FIG. 3 shows the right side of the interior of a van that is outfitted to carry all the tools necessary for installing windows and doors, in accordance with the present invention.
Figure 4:
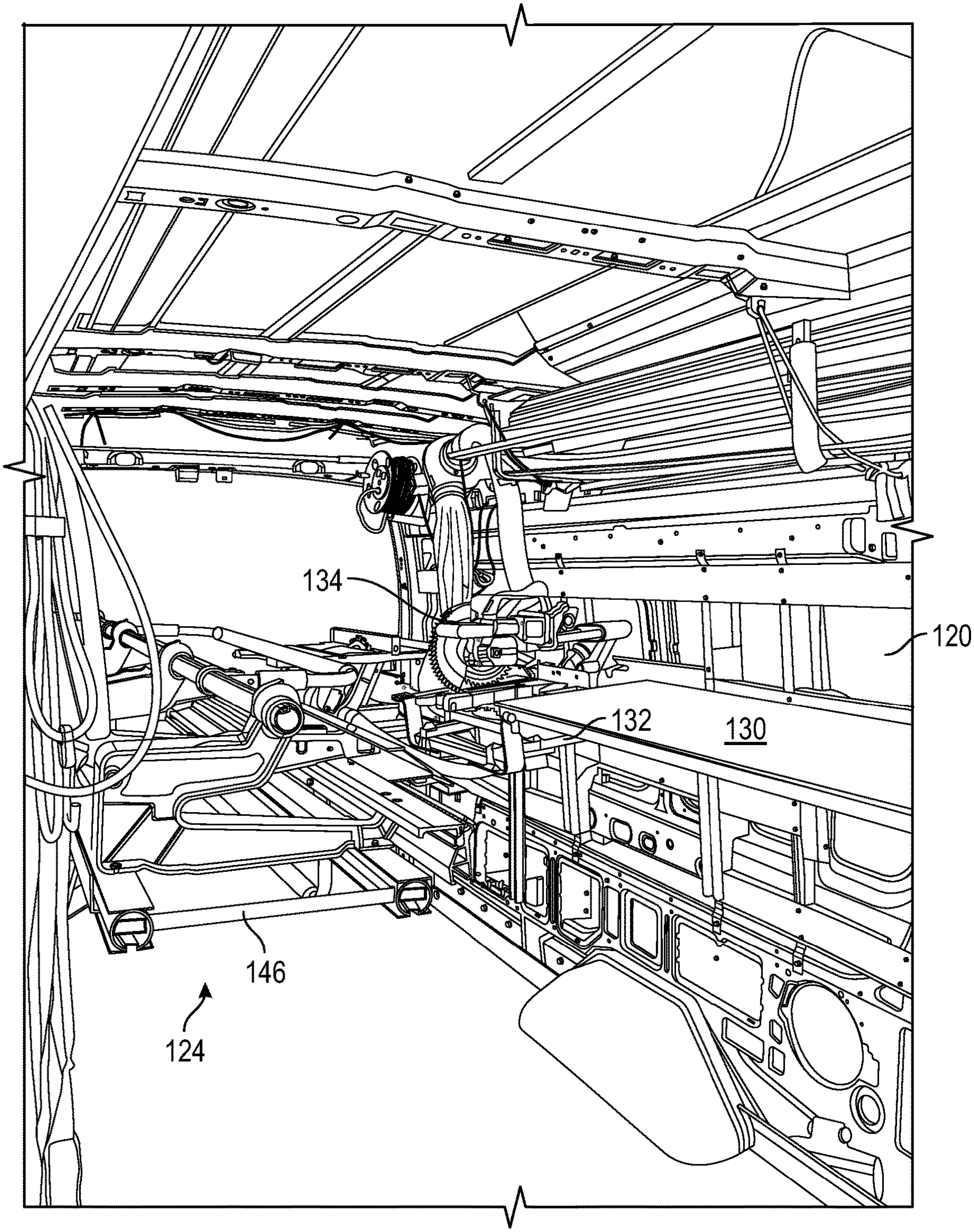
FIG. 4 shows the interior of a van that is outfitted to carry all the tools necessary for installing windows and doors, in accordance with the present invention.

Referring to FIGS. 2 and 3, wood racks 128 can be secured to the studs 121 and braces 122 on the opposite wall from the metal brake 124. A cutting table 130 can be mounted to the studs 120 and braces 122 by folding supports 132. A miter saw 134 used to make accurate cross cuts and miters in a strip of wood or metal can be mounted on the wall adjacent the cutting table 130.

A dust collection vent and piping 136 is connected to the miter saw 134. The dust collection vent and piping 136 connect to a dust collector 138 with a collection bag 140. A table saw 142 is disposed below the dust collector 138 with a collection bag 140 so that the dust from the table saw 142 can be collected in the collection bag.

A power bar is mounted to the bracket 122. A power extension cord 144 can be mounted above the table saw 142.

Figure 5:
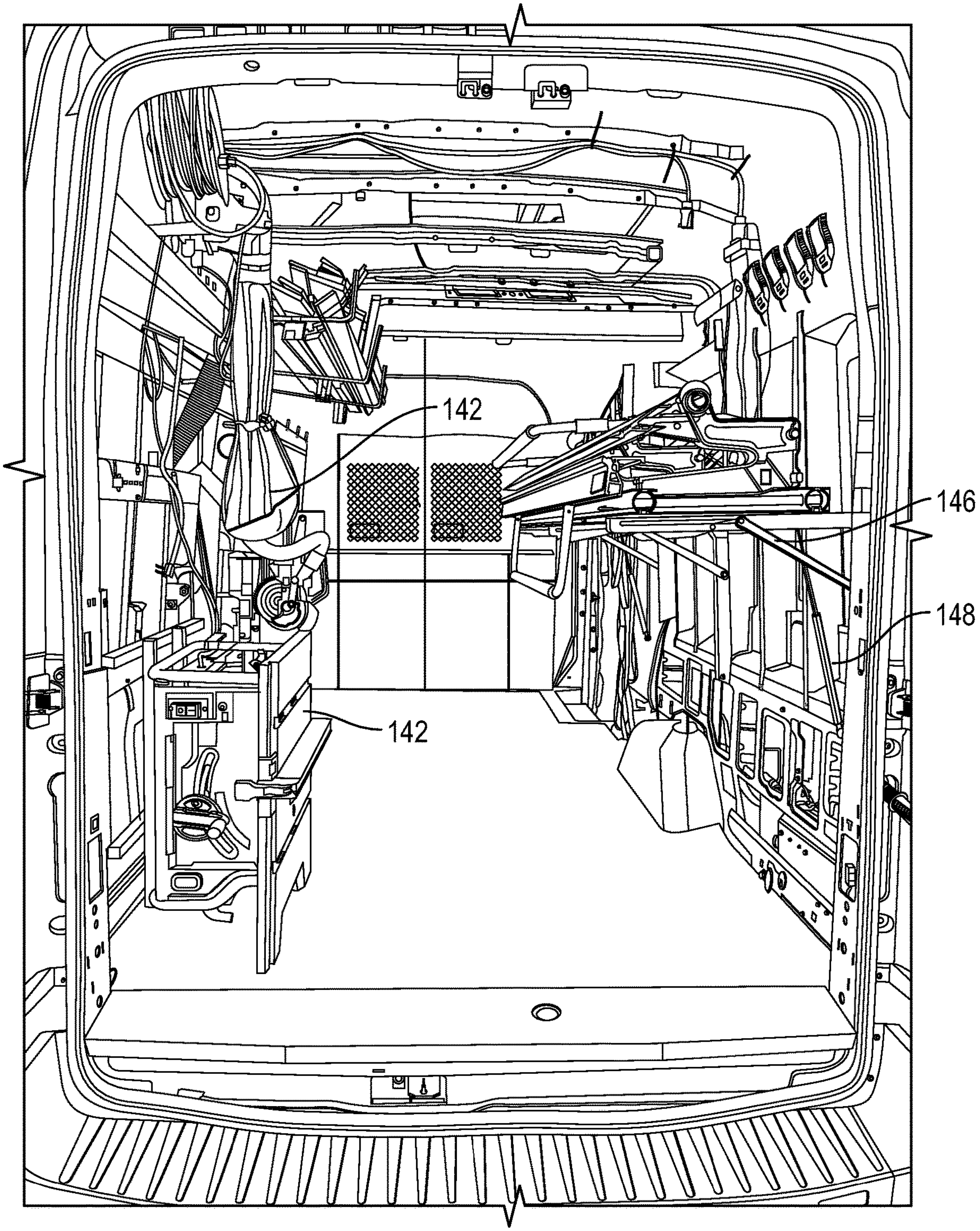
FIG. 5 shows the interior of a van of FIG. 4 viewing through the rear door and showing the tools necessary for installing windows and doors, in accordance with the present invention.

Referring to FIG. 5, there is illustrated a folding metal support 146 that supports the metal brake 124. Hydraulic piston lift supports 148 are mounted at one end to the braces and the opposite end to the bottom of the metal brake 124. The hydraulic piston lift support raise the metal brake about 90 degrees.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A van outfitted to carry all the tools necessary for installing windows and doors:

the van comprises a side opening door and a rear door to provide access to an interior of the van;

the interior of the van is configured to house a standard set of window and door installation tools consisting of a metal brake, cutting table, miter saw, dust collection system, wood racks, and battery chargers; and on opposite interior walls of the van, there are a plurality of studs and interconnecting braces to mount various tools, wherein a folding metal support is mounted to the metal brake that is fixedly mounted to the studs and interconnecting braces of the van.

2. The van of claim 1 wherein a metal brake for cutting, bending and finishing commonly used siding is fixedly mounted to the studs and interconnecting braces of one interior wall of the van.

3. The van of claim 2 wherein the commonly used siding is aluminum sheet metal.

4. The van of claim 3 wherein wood racks are secured to the studs and braces on the interior wall opposite to the one interior wall where the metal brake is mounted.

5. The van of claim 4 wherein a cutting table can be is fixedly mounted to the studs and braces by folding supports.

6. The van of claim 5 wherein the cutting table is fixedly mounted on the interior wall opposite to the one interior wall where the metal brake is mounted.

7. The van of claim 6 wherein a miter saw used to make accurate cross cuts and miters in a strip of wood or metal is fixedly mounted on the interior wall adjacent the cutting table.

8. The van of claim 7 wherein a dust collection vent and piping is connected to the miter saw.

9. The van of claim 8 wherein the dust collection vent and piping connect to a dust collector with a collection bag.

10. The van of claim 9 wherein a table saw is disposed below the dust collector with a collection bag so that the dust from the table saw can be collected in the collection bag.

11. The van of claim 10 wherein a power extension cord is fixedly mounted above the table saw.

12. The van of claim 11 wherein first and second hydraulic piston lift supports are mounted at one end to the braces and at an opposite end to a bottom of the metal brake that is fixedly mounted to the studs and interconnecting braces of the van.

13. The van of claim 12 wherein the first and second hydraulic piston lift supports raise the metal brake about 90 degrees.

14. The van of claim 13 wherein battery chargers are mounted to the studs.

15. A van outfitted to carry all the tools necessary for installing windows and doors:

the van comprises a side opening door and a rear door to provide access to an interior of the van;

the interior of the van is designed to house a standard set of window and door installation tools consisting of a metal brake, cutting table, miter saw, dust collection system, wood racks, and battery chargers;

on opposite interior walls of the van, there are a plurality of studs and interconnecting braces to mount various tools;

a metal brake for cutting, bending and finishing sheet siding a metal brake for cutting, bending and finishing sheet siding is fixedly mounted to the studs and interconnecting braces of one interior wall of the van;

a dust collection vent and piping connected to a dust collector with a collection bag, wherein a folding metal support is mounted to the metal brake that is fixedly mounted to the studs and interconnecting braces of the van; and a first and second hydraulic piston lift supports are mounted at one end to the braces and at an opposite end to the bottom of the metal brake that is fixedly mounted to the studs and interconnecting braces of the van.

16. The van of claim 15 wherein a cutting table is fixedly mounted to the studs and braces by folding supports.

17. The van of claim 16 wherein a miter saw used to make accurate cross cuts and miters in a strip of wood or metal is fixedly mounted on the interior wall adjacent the cutting table.

18. The van of claim 17 wherein a dust collection vent and piping is connected to the miter saw.

19. A van outfitted to carry all the tools necessary for installing windows and doors:

the van includes a side opening door and a rear door to provide access to an interior of the van;

the interior of the van is configured to house a standard set of window and door installation tools consisting of a metal brake, cutting table, miter saw, dust collection system, wood racks, and battery chargers; and on opposite interior walls of the van, there are a plurality of studs and interconnecting braces to mount various tools;

wherein first and second hydraulic piston lift supports are mounted at one end to the braces and at an opposite end to a bottom of the metal brake that is fixedly mounted to the studs and interconnecting braces of the van.

* * * * *